United States Patent Office 3,496,365
Patented Feb. 17, 1970

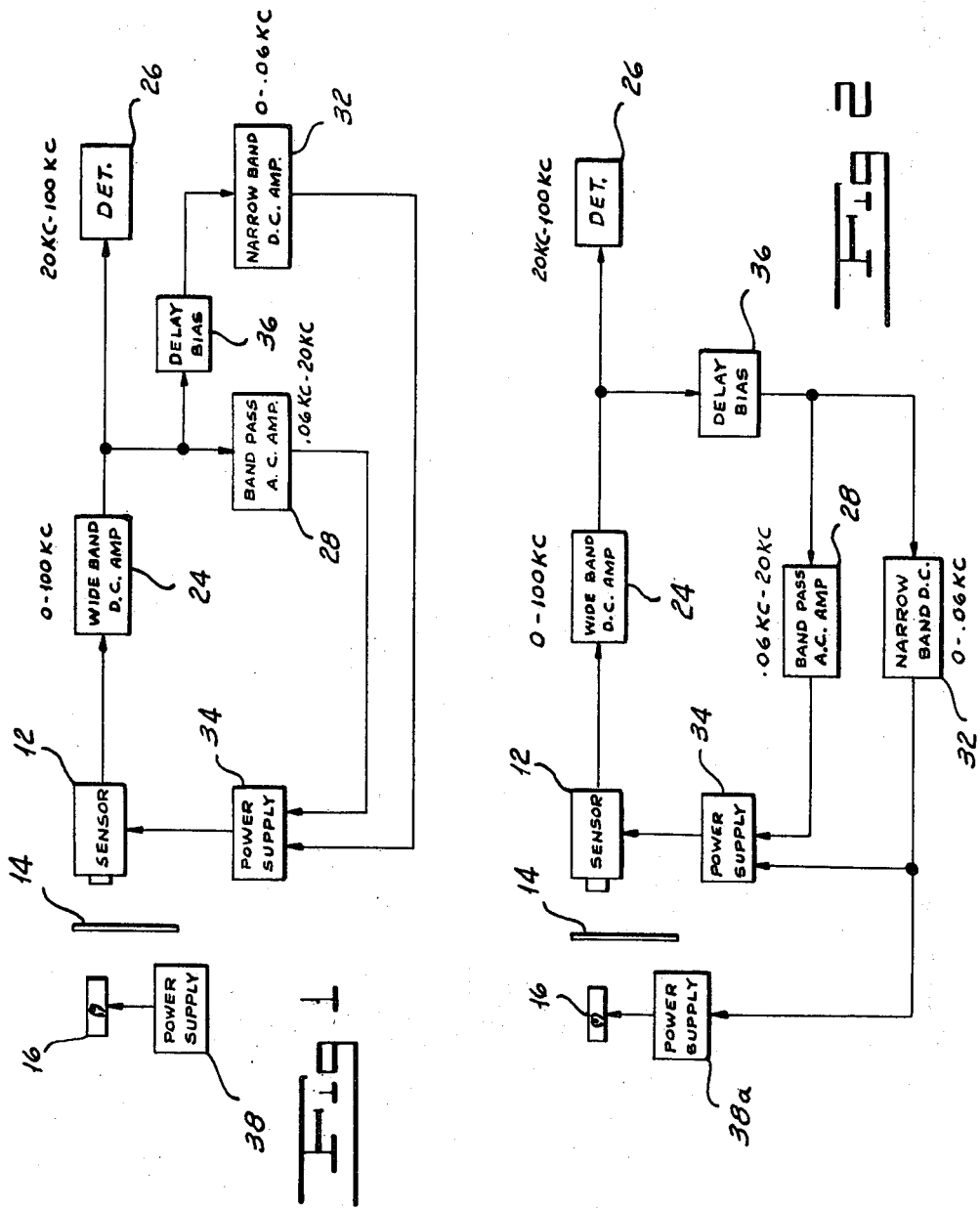

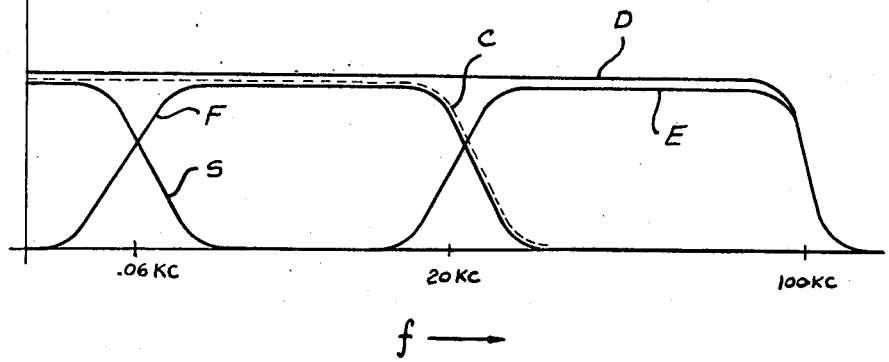
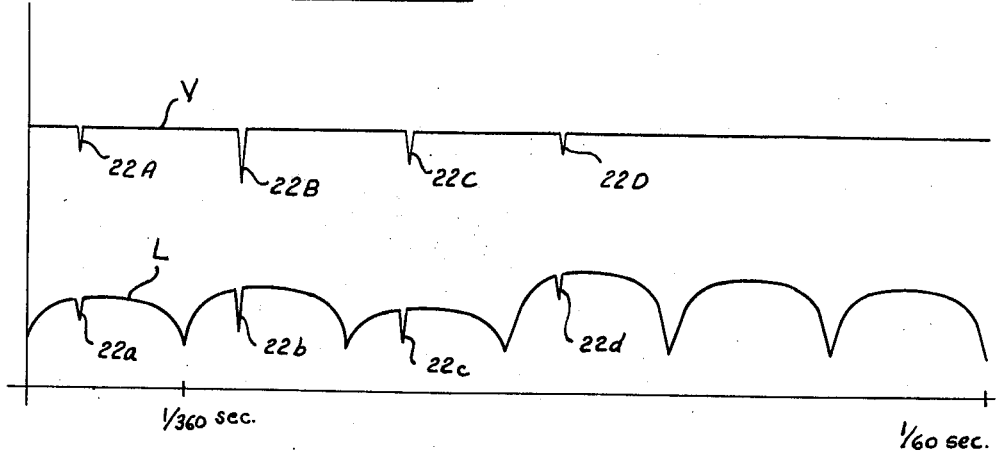

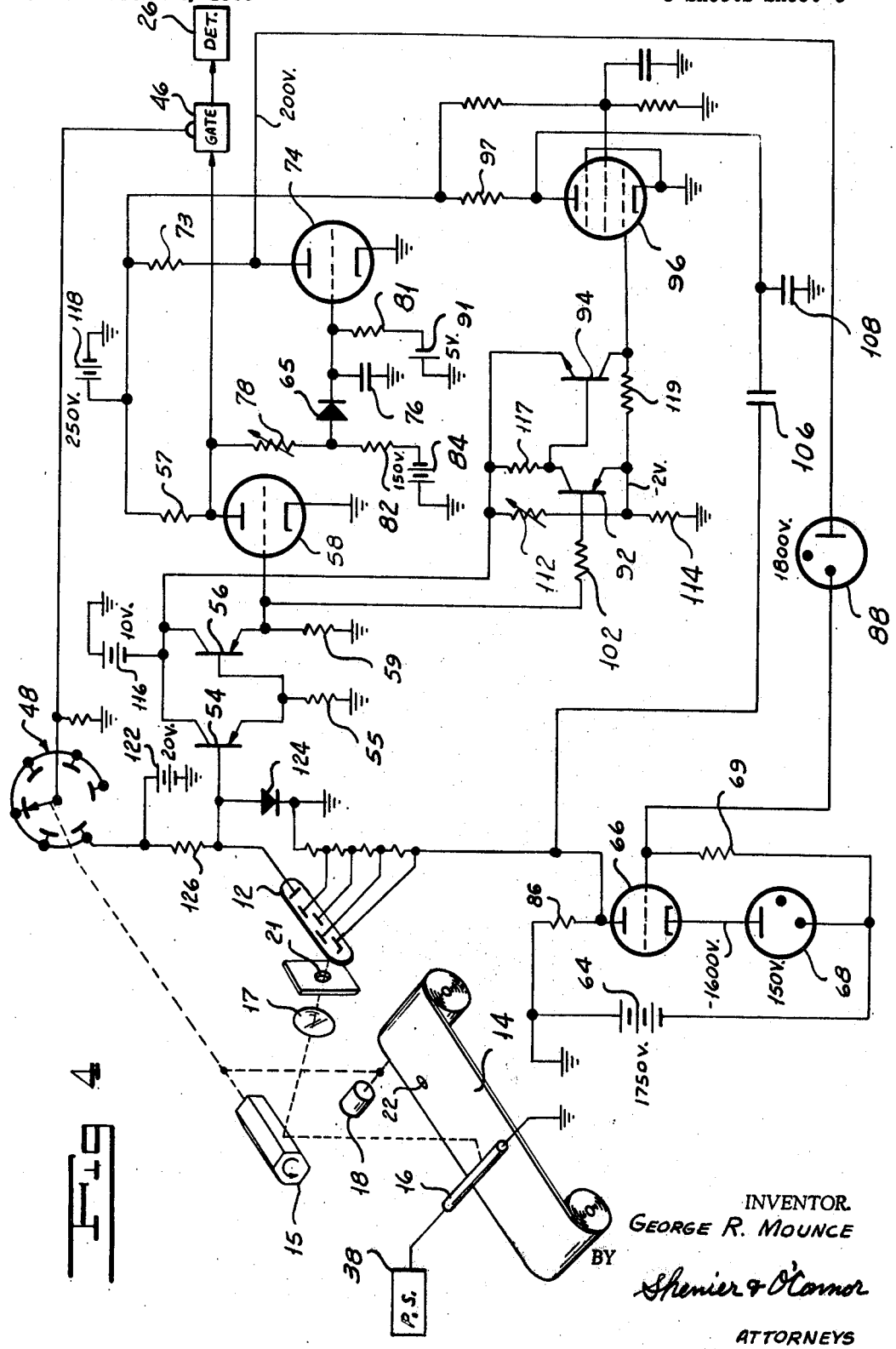

3,496,365
MATERIAL INSPECTION SYSTEMS
George R. Mounce, Willowdale, Ontario, Canada, assignor to Electronic Associates Limited, Willowdale, Ontario, Canada, a private company of Ontario
Filed Mar. 21, 1966, Ser. No. 535,874
Int. Cl. G01n 21/30
U.S. Cl. 250—219           16 Claims

ABSTRACT OF THE DISCLOSURE

A scanned material inspection system includes a light sensor, such as a photomultiplier, which is positioned to respond to light either reflected from or transmitted through material. The sensor output is applied to a low-frequency automatic gain control circuit which varies the exciting potential of the sensor to maintain constant the direct-current component of its output. However, there is provided an auxiliary automatic gain control circuit which responds over an extended frequency band including both low and moderately high frequencies. The output of the auxiliary circuit is capacitively coupled to vary the exciting potential of the photomultiplier. The high frequency response of the auxiliary circuit is so limited as to appreciably reduce scanning noise without impairing the response to very high frequency flow signals.

---

My invention relates to material inspection systems, and more particularly, to improved automatic gain control circuitry for reducing both noise and drift.

Material inspection systems of the prior art comprise a sensor which is coupled to a detector. The sensor output is normally of relatively low frequency. Flaws in the inspected material cause the sensor to produce a relatively high frequency signal. A common problem in these systems is drift and noise introduced at the sensor, both of which reduce the efficiency and reliability of the system.

Drift refers to those very low frequency changes in signal output of the detector which may be caused by accumulations of dirt and foreign matter on the sensor, changes in sensor characteristics due to ageing, and changes in power supply potentials.

In scanned systems noise is produced inherently by the scanning process. However the frequencies of such noise, while much larger than drift frequencies, is low compared with those variations in the sensor output caused by flaws.

Prior art inspection systems are usually provided with some negative feedback in the form of a low-frequency automatic gain control circuit to reduce drift. But such circuits are inadequate to control the higher frequency noise effects produce in scanned systems.

I have invented a dual feedback circuit for inspection apparatus which not only reduces drift but also reduces the higher frequency scanning noise.

One object of my invention is to provide a reliable material inspection system having low drift and low noise.

Another object of my invention is to provide an improved automatic gain control circuit for material inspection systems.

A further object of my invention is to provide a dual feedback circuit which reduces both drift and noise in scanned inspection systems.

Other and further objects of my invention will appear from the following description.

In the accompanying drawings which form part of the instant specification and which are to be read in conjunction therewith, and in which like reference numerals are used to indicate like parts in the various views:

FIGURE 1 is a diagrammatic view showing a first embodiment of my dual feedback system;

FIGURE 2 is a diagrammatic view showing a second embodiment of my invention;

FIGURE 3 is a graph showing various frequency response bands;

FIGURE 4 is a schematic view showing in detail a third embodiment of my invention; and FIGURE 5 shows typical wave forms for the light input and the voltage output of the circuit of FIGURE 4.

More particularly, referring now to FIGURE 4, a rotating mirror drum 15 causes the field of view of a photomultiplier tube 12 to scan across a web of paper 14, which is illuminated by a light source 16. The paper web 14 and the mirror drum 15 are synchronously driven by a constant speed motor 18. Any suitable light source 16 can be used, but an incandescent lamp energized by a well regulated D.C. power supply is preferable. Drum 15 has six reflecting faces and is driven at a rate of 60 revolutions per second, for example. The scanning rate is thus 360 scans per second.

The light reflected from web 14 is focused by a lens 17 and directed through an aperture 21, which defines the field of view, onto the photocathode of a sensor 12. Angular changes inherent in the scanning process cause variation in the light input to sensor 12 during a single scan across the web 14. Unequally reflecting surfaces on drum 15 cause variations from scan to scan. Flaws, such as the spot indicated at 22, cause sharp changes in the sensor output during the period of a scan.

In FIGURE 5, curve L shows the variation in light input during six successive scans for one revolution of drum 15. The pulses 22a through 22d are occasioned by flaw 22.

Referring now to FIGURE 1, a wide-band direct-current amplifier 24 amplifies the sensor output signal to a suitable level for coupling to the input of a detector circuit 26, which may include pulse amplitude discriminators, counters, and recorders. Amplifier 24 has a band width extending from zero cycle to 100 kilocycles.

Efficient detection and analysis of flaw signals requires a noise-free and drift-free input to detector 26. To this end I provide two negative feedback circuits which automatically vary the sensor excitation. A first "fast" feedback circuit includes a band-pass alternating-current amplifier 28. A second "slow" feedback circuit includes a narrow-band direct-current amplifier 32.

The pass band of amplifier 28 extends from 60 cycles to 20 kc. for example. The pass band of direct-current amplifier 32 extends from zero to 60 cycles, for example. These amplifiers provide negative feedback signals for the sensor power supply 34, which greatly attenuate variations in the sensor output within their respective frequency bands.

In FIGURE 3, curve S shows the frequency band of my slow feedback circuit; curve F shows that of my fast feedback circuit; and curve C shows the composite frequency band of both feedback circuits in combination. The curve D shows the pass band of direct-current amplifier 24. Curve E shows the frequency band over which signals of appreciable amplitude are delivered to the detector. It will be noted from curve C that my dual feedback circuits provide a high negative feedback for all frequencies below 20 kc. Thus variations in the output of amplifier 24 of a frequency less than 20 kc. are suppressed.

In curve L of FIGURE 5 the minimum frequency for scanning noise is 60 cycles per second. Most noise however occurs at the basic scanning frequency of 360 cycles per second. The scanning noise may contain harmonic components extending perhaps to frequenies of 20 kc. Flaw signals may have minimum frequency components exceeding 20 kc. The fast feedback circuit thus attenuates scanning noise without appreciably diminishing the desired flaw signals. Curve V shows the output voltage of amplifier 24. It will be noted that the output voltage is constant except for voltage output pulses 22A through 22D which are coincident with the light input pulses 22a through 22d; and substantially all scanning noise is suppressed. As in the prior art, the slow feedback circuit substantially eliminates drift.

Preferably, I provide an amplitude delay bias in at least the slow feedback circuit to control precisely the average output of amplifier 24. In the embodiment of FIGURE 1, an amplitude discriminating reference circuit 36 provides a delay bias for the slow feedback circuit. Both feedback circuits are coupled to power supply 34, which controls the excitation of sensor 12.

FIGURE 2 shows an alternate embodiment of my invention, in which reefrence circuit 36 provides a common delay bias for both feedback circuits. Additionally, in this embodiment the output of amplifier 32 is coupled to a lamp power supply 38a. Supply 38a may include a motor-driven rheostat or other means well known to the art for varying the voltage impressed on lamp 16. In this embodiment, I control sensitivity (or intrinsic gain) by varying both the light input to sensor 12 as well as its intrinsic gain. While lamp 16 has an appreciable thermal lag, its frequency response is sufficiently high to eliminate drift at frequencies of up to 10 cycles per second.

As indicated in both FIGURES 1 and 2, sensor 12 may respond to light from lamp 16 transmitted through web 14.

Referring now to FIGURE 4, commutator 48, rotating synchronously with drum 15, is provided with six equally spaced contacts which generate six pulses each revolution. These pulses periodically inhibit a gating circuit 46 from transmitting outputs from the plate of a triode 58 to a detector 26 when the sensor field of view is outside the limits of the edges of web 14. When the field of view is within the limits of the edges of web 14, gate 46 is closed, permitting an input to be coupled to detector 26. In this embodiment, the sensor 12 responds to light reflected from the web.

The negative terminal of a 20 volt battery 122 is grounded and the positive terminal thereof supplies voltage for the six contacts of commutator 48 and is further coupled through a resistor 126 to the anode of photomultiplier 12. The anode of photomultiplier 12 is connected forwardly through a diode 124 to ground. Diode 124 clamps the anode of photomultiplier 12 to ground, since the current through resistor 126 exceeds the dark current of sensor 12; and the excess clamping current flows through diode 124.

Th anode output of photomultiplier 12 drives a first p-n-p emitter follower transistor 54 the output of which drives a second p-n-p emitter follower transistor 56. The emitter output of transistor 56 is coupled to the grid of grounded cathode triode 58 and through a resistor 102 to the base of a p-n-p transistor 92. The emitters of transistors 54 and 56 are coupled to ground through respective resistors 55 and 59. The positive terminal of a 10 volt battery 116 is grounded and the negative terminal thereof is connected to the collectors of transistors 54 and 56.

The negative terminal of a 250 volt battery 118 is grounded, and its positive terminal is connected through respective resistors 57 and 73 to the plates of triodes 58 and 74. For the slow feedback circuit, I provide a voltage comparator network comprising two resistors 78 and 82 connected in series between the plate of triode 58 and the negative terminal of a 150 volt battery 84, the positive terminal of which is grounded. The resistance value of resistor 78 is adjusted to be equal to that of resistor 82. I connect the junction of resistors 78 and 82 forwardly through a diode 65 to the grid of a grounded-cathode triode 74. The positive terminal of a 5 volt battery 91 is grounded and its negative terminal is coupled through a resistor 81 to the grid of triode 74. The grid of triode 74 is coupled to ground through a capacitor 76 which acts as a low pass filter and determines the cutoff frequency of the narrow band D.C. amplifier 32 of FIGURES 1 and 2. Battery 91 biases triode amplifier 74 so that it is near cutoff but draws sufficient current that the plate potential is approximately 200 volts.

With the grid of triode 58 at ground potential its plate potential is 100 volts. Thus the potential at the junction of resistors 78 and 82 is −25 volts, reverse biasing diode 65.

I couple the plate of triode 74 to the grid of a high voltage triode 66 through a corona discharge tube 88, which sustains a constant 1800 volt drop. The cathode and grid of triode 66 are connected respectively through a 150 volt regulating tube 68 and a large resistor 69 to the negative terminal of a 1750 volt D.C. power supply 64, the positive terminal of which is grounded. The cathode potential of triode 66 is thus −1600 volts. I couple the plate of triode 66 to ground through resistor 86 and to the photocathode of photomultiplier 12. When the plate potential of triode 74 is 200 volts, the grid potential of triode 66 is −1600 volts; and triode 66 conducts heavily, causing a tube drop of 50 volts and a corresponding plate potential of −1550 volts.

The emitter of transistor 92 is connected to the junction of a variable resistor 112 and a resistor 114, which are connected in series between the negative terminal of battery 116 and ground, forming a voltage divider network. The collector of transistor 92 is coupled to the base of an n-p-n transistor 94 and through a resistor 117 to the negative terminal of battery 116. The emitter of transistor 94 is coupled to the negative terminal of battery 116, and its collector is coupled through a resistor 119 to the emitter of transistor 92. The gain of the amplifier comprising transistors 92 and 94 in combination is approximately equal to the resistance ratio of resistors 119 and 114. In the absence of a light input, the base of transistor 92 is at ground potential. The potential of the emitter of transistor 92 may be −2 volts; and both transistors 92 and 94 are cutoff.

I couple the collector of transistor 94 to the grid of a grounded-cathode pentode 96, the plate of which is coupled to the positive terminal of battery 118 through a plate resistor 97. I provide a conventional capacitor-bypassed, voltage-divider bias for the screen grid of pentode 96.

I couple the plate of pentode 96 to the photocathode of photomultiplier 12 through a blocking capacitor 106 and to ground through a capacitor 108. Capacitor 106 has a high impedance for signals below 60 cycles; and capacitor 108 provides a low impedance path to ground for signals above 20 kc. Capacitors 106 and 108 respectively determine the low and high frequency limits of the band-pass A.C. amplifier 28 of FIGURES 1 and 2.

In operation, assume drum 15 is rotating counterclockwise, as shown, and begins to reflect light from one edge of web 14 upon the photocathode. This light input to sensor 12 increases its anode current. When the anode current increases sufficiently that the excess clamping current through diode 124 decreases to zero, then any further increase in anode current causes the anode voltage to drop below ground potential. Emitter followers 54 and 56 cause the grid of triode 58 to reproduce, at a low impedance level, the voltage variations at the anode of sensor 12.

While the anode of sensor 12 is clamped to ground by diode 124, the grid of triode 58 is at ground potential; and the large current flow through triode 58 lowers its plate potential to approximately 100 volts, as previously indicated. When the anode of sensor 12 decreases below ground potential, the grid of tube 58 likewise drops below ground, decreasing the plate current, and increasing the plate potential.

When the output current of photomultiplier 12 increases sufficiently that the plate potential of triode 58 rises to 140 volts, diode 65 becomes forwardly biased. Any further increase in plate potential of tube 58 now raises the grid potential of tube 74, increasing its plate current, and decreasing its plate potential below 200 volts. The decrease in plate potential of triode 74 decreases the grid potential of the triode 66 below —1600 volts, reducing its plate current, and increasing its plate potential above —1550 volts. The potential across photomultiplier 12 is thus decreased, causing a corresponding decrease in photomultiplier sensitivity and hence in anode current.

Because of the very large resistance of plate resistor 86 required to prevent excessive current drain from power supply 64, triode amplifier 66 inherently has a narrow band width. While its band width may be somewhat greater than that of lamp 16, it is still not sufficient to attenuate the higher harmonic components of scanning noise. However, it should be noted that the maximum frequency response required of triode amplifier 66 is only 60 cycles per second.

I can adjust the delay of the fast feedback circuit by means of variable resistor 112 to meet any desired requirements. The delay in the fast feedback circuit can be greater than, less than, or equal to the delay in the slow feedback circuit. For example, I may advantageously adjust resistor 112 so that when the plate voltage of triode 58 increases to 130 volts, the base voltage of transistor 92 is sufficiently negative to cause transistor 92 to begin conduction. Current flow through collector resistor 117 also causes transistor 94 to conduct. Current flows from ground through resistor 114, resistor 119, and transistor 94. The current flow through resistor 114 lowers the emitter potential of transistor 92, providing a negative feedback which stabilizes the gain of transistors 92 and 94 in combination.

With transistors 92 and 94 cut off, the grid of pentode is biased negatively at —2 volts, which causes pentode 96 to operate in a linear region remote from both cutoff and from saturation. A current flow in transistor 94 causes a decrease in pentode grid potential, a decrease in pentode plate current, and an increase in pentode plate potential. A rise in plate potential of pentode 96 is coupled to the photocathode of sensor 12 through blocking capacitor 106, decreasing the potential across sensor 12, decreasing its sensitivity, and hence its anode current. The output impedance of pentode 96 is substantially equal to the value of resistor 97; and this is much lower than the parallel equivalent resistance of resistor 86 and the plate resistance of triode 66. Thus for frequencies greater than 60 cycles, where the impedance of capacitor 106 is small, the photocathode of sensor 12 is driven from a low impedance source to provide a high frequency response.

It will be appreciated by those skilled in the art that I vary the gain of sensor 12 with my dual feedback circuits in such a sense as to maintain constant the anode current. However, since little negative feedback exists at frequencies greater than 20 kc., the anode current of sensor 12 is permitted to vary at the higher frequencies of flaw signals.

It will also be appreciated by those skilled in the art that the material inspection system I have described is typical of a number of material inspection systems such, for example, as those which include infrared radiation sensors, nuclear radiation sensors, and magnetic or capacitive sensors. It will also be understood that my dual feedback system may also be used in systems employing alternating-current excitation rather than the direct-current excitation shown. The use of an alternating-current carrier is especially advantageous in systems employing magnetic and capacitive devices to sense modulation of the carrier.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A scanned material inspection system including in combination a photomultiplier having an anode and a photocathode, means for directing upon the photocathode light from a certain small area of the surface of the material to be inspected, means for causing said area to scan said surface at a certain frequency, a source of exciting potential, means coupling the source to the anode and photocathode, whereby a flow of anode current is produced as a function of the exciting potential and of the light directed upon the photocathode, a detector, means for coupling said anode to said detector, means responsive to anode current for controlling the exciting potential over a frequency band extending from zero cycles per second to a frequency which is less than said scanning frequency, and means responsive to anode current for controlling the exciting potential over a frequency band which extends from a frequency greater than zero cycles per second to a frequency which is appreciably greater than said scanning frequency.

2. A scanned system as in claim 1 in which the means coupling the anode to the detector comprises a gating circuit and means for actuating the circuit at the scanning frequency.

3. A material inspection system including in combination a photomultiplier having an anode and a photocathode positioned to receive light from the material to be inspected, a source of exciting potential, means for coupling the source to the anode and photocathode, whereby a flow of anode current is produced as a function of the exciting potential and of the light received by the photocathode, means responsive to anode current for controlling the light received by said photocathode over a frequency band extending from zero cycles per second to a certain first frequency, means responsive to anode current for controlling the exciting potential over a frequency band extending from zero cycles per second to a certain second frequency, and means responsive to anode current for controlling the exciting potential over a frequency band which extends from a frequency greater than zero cycles per second to a third frequency which is appreciably greater than either of said first and second frequencies.

4. A material inspection system including in combination a photomultiplier having an anode and a photocathode positioned to receive light from the material to be inspected, a source of exciting potential, means for coupling the source to the anode and photocathode, whereby a flow of anode current is produced as a function of the exciting potential and of the light received by the photocathode, first means responsive to anode current for controlling the exciting potential over a frequency band extending from zero cycles per second to a certain first frequency, and second means responsive to anode current for controlling the exciting potential over a frequency band extending from a frequency greater than zero cycles per second to a second frequency which is appreciably greater than said first frequency.

5. A material inspection system as in claim 4 wherein said first means comprises a direct-current amplifier and means for causing the amplifier to respond only to anode currents greater than a certain magnitude.

6. A material inspection system as in claim 4, wherein said first means comprises a direct-current amplifier and means for causing the amplifier to respond only to anode currents greater than a certain magnitude, and wherein said second means comprises alternating-current amplifying means and means for causing the amplifying means to respond only to anode currents greater than a predetermined magnitude.

7. A material inspection system as in claim 4, wherein said first means comprises a direct-current amplifier, wherein said second means comprises an alternating-current amplifier, the system further including means for causing said amplifiers to respond only to anode currents exceeding a certain magnitude.

8. A material inspection system including in combination a photomultiplier having an anode and a photocathode positioned to receive light from the material to be inspected, a source of exciting potential, means for coupling the source to the anode and photocathode, whereby a flow of anode current is produced as a function of the exciting potential and of the light received by the photocathode, means responsive to anode current for controlling the light received by said photocathode over a frequency band extending from zero cycles per second to a certain first frequency, and means responsive to anode current for controlling the exciting potential over a frequency band which extends from a frequency greater than zero cycles per second to a second frequency which is appreciably greater than said first frequency.

9. A material inspection system including in combination sensing means responsive to a certain characteristic of the material for providing an output, the sensing means having a sensitivity which is determined by the ratio of the change in the output to the change in said characteristic, first means responsive to said output over a first frequency band extending from zero cycles per second to a certain first frequency for controlling the sensitivity of the sensing means over a frequency band having the same extent as the first band, and second means responsive to said output over a second frequency band extending from a frequency appreciably greater than zero cycles per second to a second frequency which is appreciably greater than the first frequency for controlling the sensitivity of the sensing means over a frequency band having the same extent as the second band.

10. A system as in claim 9, in which the sensing means comprises a device having a high gain and in which one of the first and second means varies the gain.

11. A system as in claim 9, in which the sensing means comprises a device having an input and providing a high gain and in which one of the first and second means varies said input.

12. A system as in claim 9, in which the sensing means comprises a device having a high gain and in which each of said first and second means varies the gain.

13. A system as in claim 9, in which the sensing means comprises a device having an input and providing a high gain and in which said first means varies said input and said second means varies said gain.

14. A system as in claim 9, in which the sensing means comprises a device having an input and providing a high gain, in which the first means varies said input, and in which both the first and second means varies the gain.

15. A material inspection system as in claim 9, wherein said first means includes a circuit having an input and providing an output in response thereto only for inputs greater than a predetermined magnitude.

16. A material inspection system as in claim 9, wherein said first means includes a circuit having an input and providing an output in response thereto only for inputs greater than a predetermined magnitude and wherein said second means includes a circuit having an input and providing an output in response thereto only for inputs exceeding a certain magnitude.

References Cited

UNITED STATES PATENTS

| | | |
|---|---|---|
| 2,812,447 | 11/1957 | MacMartin et al. |
| 3,026,415 | 3/1962 | Lake et al. |
| 3,061,731 | 10/1962 | Thier et al. |
| 3,135,867 | 6/1964 | Daneff. |
| 3,183,353 | 5/1965 | Baldwin _____ 250—207 |
| 3,271,699 | 9/1966 | Marzan et al. _____ 250—207 |
| 3,286,567 | 11/1966 | Wright. |
| 3,340,400 | 9/1967 | Quittner. |
| 3,365,545 | 1/1968 | Petrie. |
| 2,871,369 | 1/1959 | Williams _____ 250—214 |
| 2,976,430 | 3/1961 | Sander _____ 330—103 X |

OTHER REFERENCES

Neff et al., IBM Technical Disclosure Bulletin, vol. 7, No. 7, December 1964, p. 621.

WALTER STOLWEIN, Primary Examiner

U.S. Cl. X.R.

250—207; 330—103; 356—237